US008125750B2

(12) United States Patent
Probert

(10) Patent No.: US 8,125,750 B2

(45) Date of Patent: Feb. 28, 2012

(54) STREET FURNITURE SAFETY DEVICE

(75) Inventor: Norman Probert, Worcester (GB)

(73) Assignee: PACS Services Limited, Worcestershire (GB)

( * ) Notice: Subject to any disclaimer, the term of this patent is extended or adjusted under 35 U.S.C. 154(b) by 483 days.

(21) Appl. No.: 12/280,113

(22) PCT Filed: Feb. 12, 2007

(86) PCT No.: PCT/GB2007/000493

§ 371 (c)(1),
(2), (4) Date: Oct. 27, 2008

(87) PCT Pub. No.: WO2007/096583

PCT Pub. Date: Aug. 30, 2007

(65) Prior Publication Data

US 2010/0002347 A1 Jan. 7, 2010

(51) Int. Cl.
*H02H 3/00* (2006.01)

(52) U.S. Cl. .......................................................... 361/59

(58) Field of Classification Search ..................... 361/59
See application file for complete search history.

(56) References Cited

U.S. PATENT DOCUMENTS

| | | | | |
|---|---|---|---|---|
| 4,104,724 | A * | 8/1978 | Dix et al. | 700/212 |
| 5,335,160 | A | 8/1994 | Savoca | |
| 5,462,384 | A * | 10/1995 | Arlandis | 404/6 |
| 5,698,785 | A * | 12/1997 | Rich et al. | 73/514.33 |
| 5,818,122 | A | 10/1998 | Miyazawa et al. | |
| 5,851,108 | A | 12/1998 | Clymer et al. | |
| 6,188,182 | B1 * | 2/2001 | Nickols et al. | 315/294 |
| 6,429,790 | B1 | 8/2002 | Frese et al. | |
| 7,492,064 | B1 * | 2/2009 | Vaughn | 307/119 |
| 2006/0076833 | A1 * | 4/2006 | Kojima | 307/10.1 |

FOREIGN PATENT DOCUMENTS

| | | |
|---|---|---|
| DE | 4405246 A1 | 8/1995 |
| EP | 0134266 A1 | 3/1985 |
| GB | 1286078 | 8/1972 |

OTHER PUBLICATIONS

Search Report from British Application No. GB0603846.7 (1 page), May 12, 2006.

(Continued)

*Primary Examiner* — Jared Fureman
*Assistant Examiner* — Scott Bauer
(74) *Attorney, Agent, or Firm* — Wood, Herron & Evans, LLP

(57) ABSTRACT

An electrical isolation system specifically adapted for use in street furniture (10) having an electrical supply (24) to working electrical components (20) is described. The system includes an impact sensor (22) located in use within the street furniture and a monitoring unit (30) and an electrical isolator (32) located in use remote from the street furniture. When the impact sensor is activated a signal is sent to the monitoring unit which sends a signal to the electrical isolator to disconnect the electrical supply to the working components of the street furniture. A method of providing electrical isolation in street furniture (10) having an electrical supply (24) to working electrical components (20) is also described. In the event that the street furniture is damaged, the method including the steps of: a) sensing an impact suffered by the street furniture; b) sending a signal to indicate that an impact has occurred to a monitoring unit at a location remote from the street furniture; c) the monitoring unit acting to disconnect the electrical supply to street furniture at the location remote from the street furniture.

17 Claims, 3 Drawing Sheets

OTHER PUBLICATIONS

International Search Report from PCT Application No. PCT/GB2007/000493 (2 pages), Apr. 7, 2007.

International Preliminary Report on Patentability PCT Application No. PCT/GB2007/000493 (5 pages), Aug. 26, 2008.

* cited by examiner

STREET FURNITURE SAFETY DEVICE

DESCRIPTION OF INVENTION

The invention relates to a safety device for street furniture and in particular to an isolation system for use in street furniture which include an electrical supply, such as for examples a traffic signal (commonly referred to as a traffic light), street light, or illuminated sign.

Many installations of street furniture which include an electrical supply are located very close to the roadway, and thus are vulnerable to being collided with by vehicles. When such a collision occurs the street furniture itself represents a danger to the vehicles and its occupants, in that it might remain in place as a rigid structure ensuring that the vehicle suffers very significant damage or it might fall onto the vehicle. Recently laws or new practices have been introduced in many territories which require or advise that, at least in some circumstances such as on roads with a speed limit of 50 mph or higher, the street furniture collapses in some predetermined manner in order to minimise the physical danger the street furniture represents.

In addition the electrical supply itself can represent a danger to the people involved in such an accident, or those who arrive to assist those involved, or those who subsequently arrive to repair the street furniture. If the electrical supply remains connected to the damaged street furniture then live electrical wires may be open to the elements and to being touched by such people, thus leading to risk of electric shocks being inflicted on those people, and to sparks igniting spilt fuel or chemicals.

In some territories there are now also requirements to disconnect the electrical supply to the street furniture in the event of damage to it, and in general such safety cut-off systems are being included in new installations and in some cases in refurbishment of existing installations. In the United Kingdom at present the only system available to implement this requirement includes an in-line socket and connector which are held under tension and are designed to part company when the street furniture is badly damaged, thus disconnecting the electrical supply to the street furniture within the street furniture itself. However, this has two distinct disadvantages. First, plugs and sockets used in this way tend to be unreliable, and second they only work to disconnect the electrical supply in certain kinds of accidents and then only within the street furniture installation itself. This means that a live feed still exists to the base of the street furniture and this still represents a risk of electrical shock in some circumstances, in particular to those people who come to repair the street furniture.

It is an aim of the present invention to provide an alternative electrical isolation system for use in street furniture.

According to a first aspect of the present invention there is provided an electrical isolation system as set out in claim 1. Further features of the electrical isolation system according to the invention are set out in dependent claims 2 to 10.

According to a second aspect of the present invention there is provided a method of providing electrical isolation as set out in claim 11. Further features of the method according to the invention are set out in dependent claims 12 to 15.

According to a third aspect of the present invention there is provided street furniture having an electrical supply to working electrical components and including an electrical isolation system according to the first aspect of the invention and/or which operates in accordance with the method of the second aspect of the invention.

An example of the present invention will now be described, by way of example only, with reference to the drawings in which.

Figure 1:
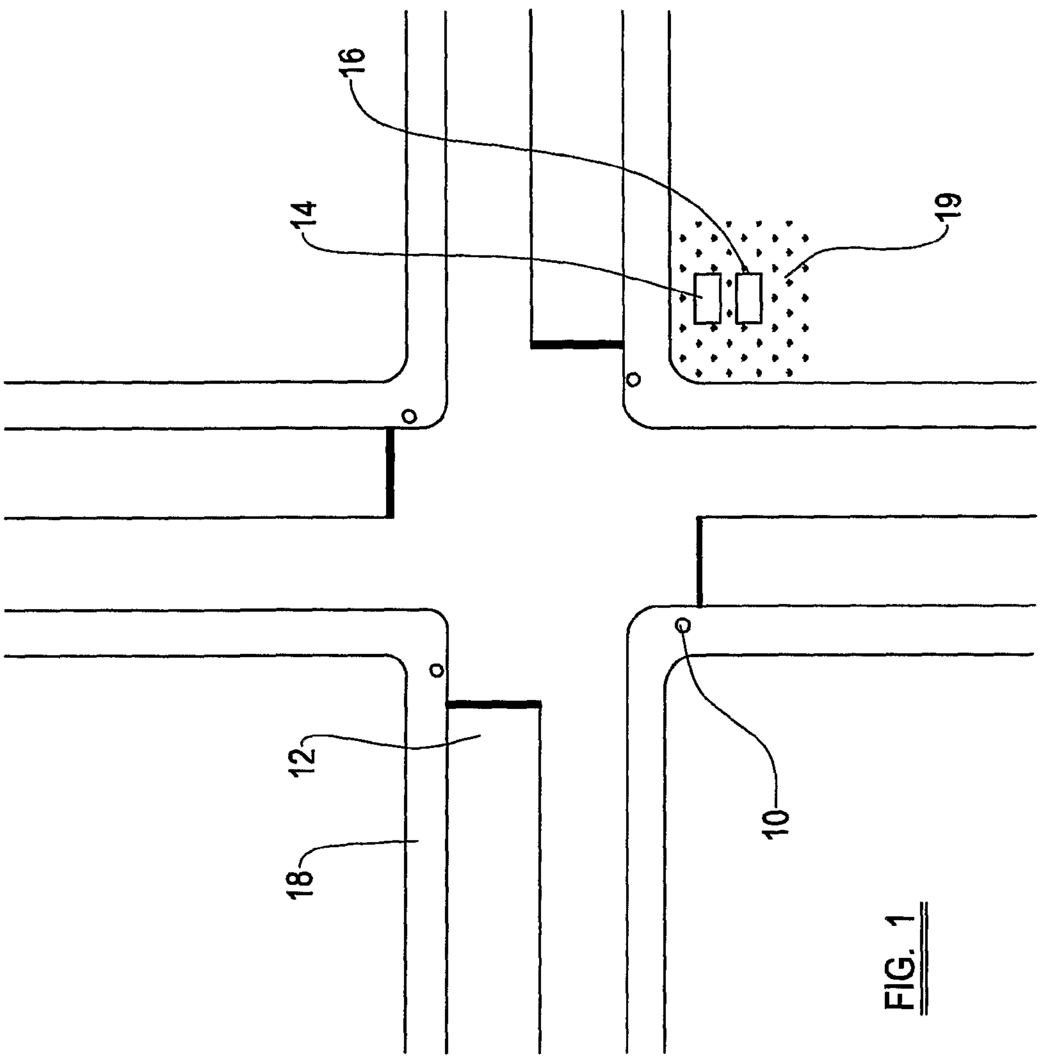
FIG. 1 is a schematic plan view of a cross-roads junction with traffic signals incorporating the electrical safety isolation system according to the invention.
Figure 2:
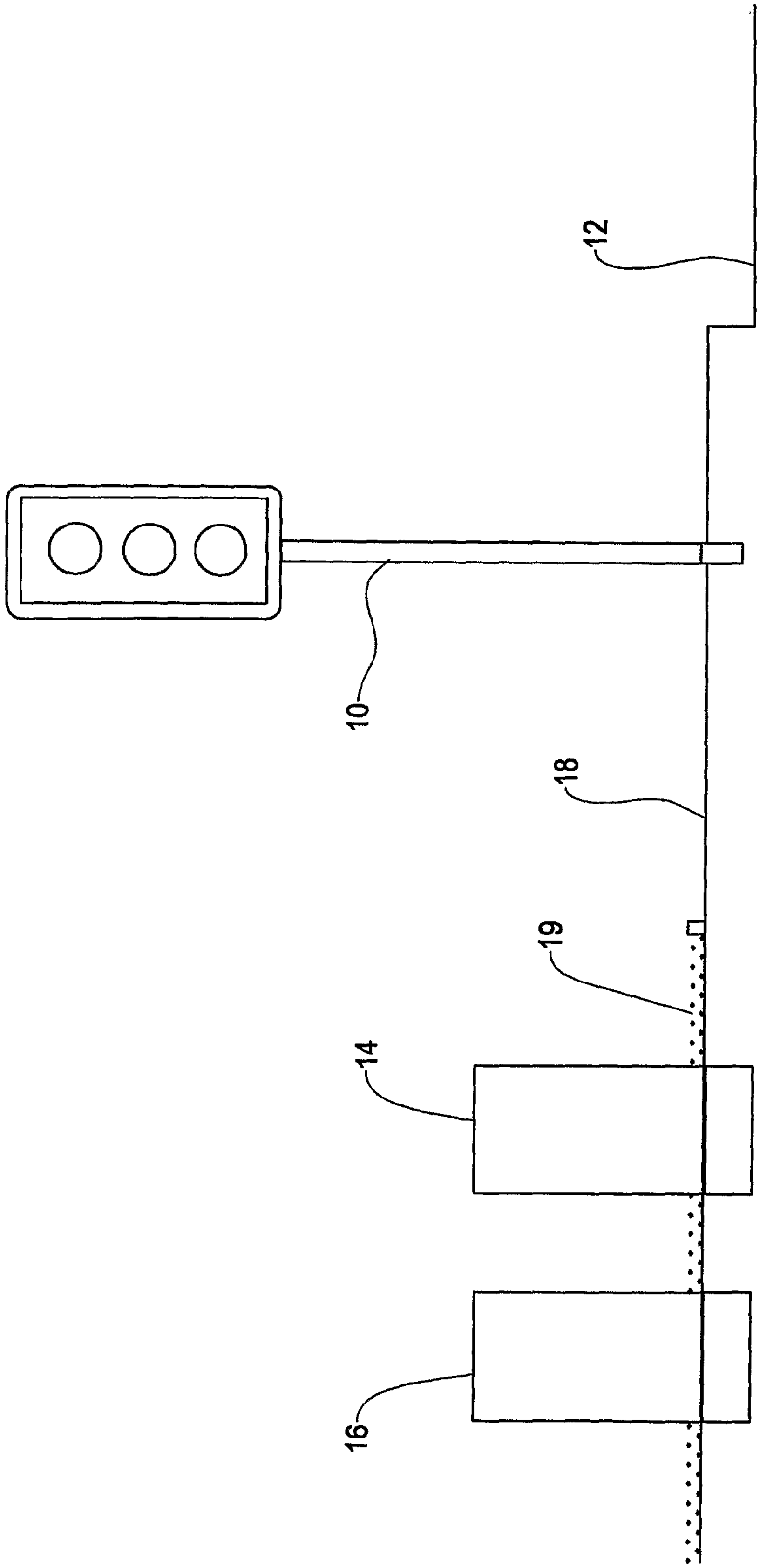
FIG. 2 is a side view of part of the junction of FIG. 1 showing a traffic signal, a termination cabinet and a control cabinet.

Referring first to FIGS. 1 and 2, a simple cross-roads junction having traffic signal control is illustrated in two different views. There are four traffic signals 10, one at each road entry to the junction, located close to the roadway 12 and thus vulnerable to being collided with by vehicles. The traffic signal control for the junction includes a termination cabinet 14 and a control cabinet 16 (as in the prior art, for normal control of the traffic signal installation at the junction, and thus which will not be described further here), located at a greater distance from the road way than the traffic signals 10 are, and in this example back off the pedestrian pavement 18 in a grassed area 19. It should be understood that a single cabinet may be provided in place of the two described here.

Figure 3:
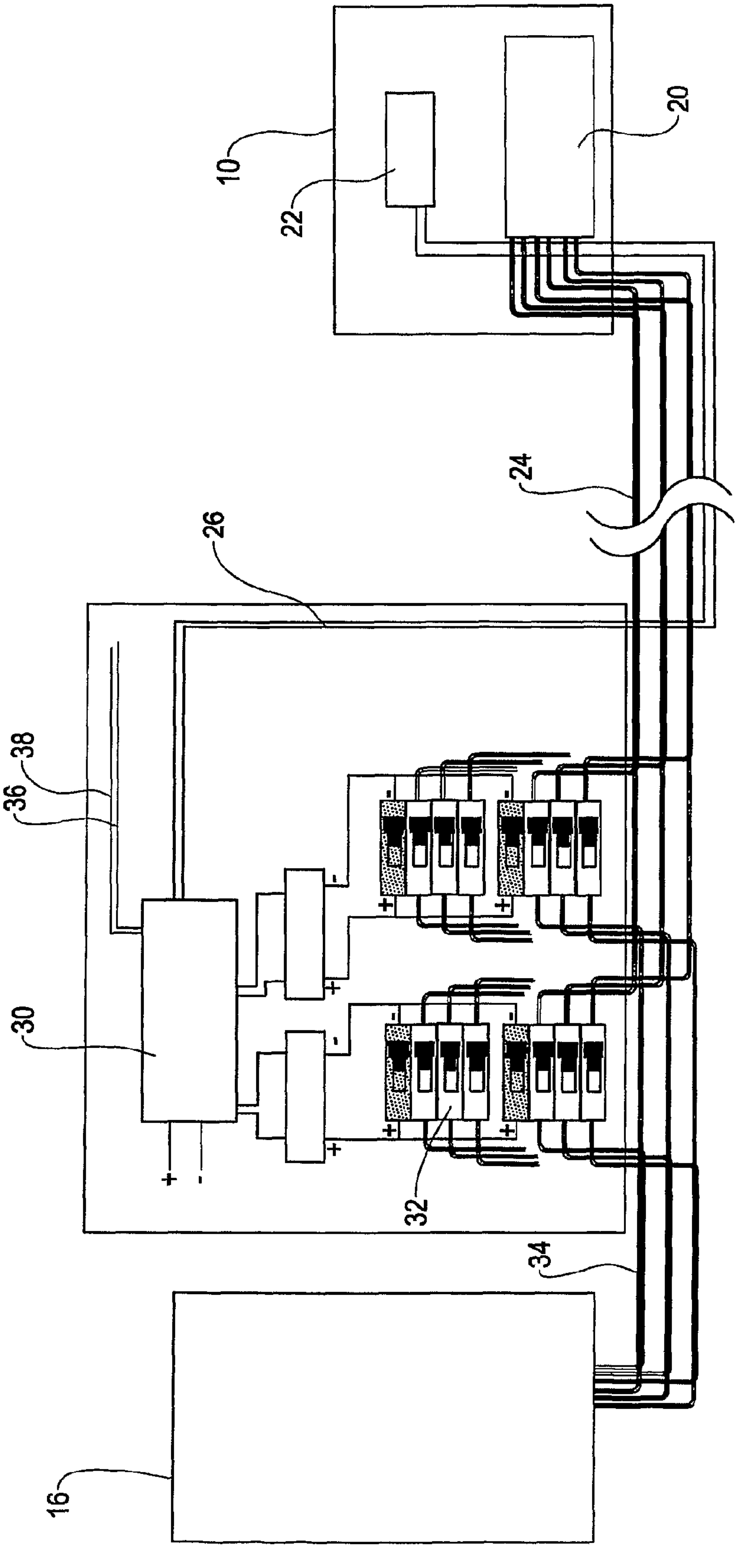
FIG. 3 is a schematic view of the electrical safety isolation system.

Referring now also to FIG. 3, a schematic view of the traffic signal control for the junction is illustrated. In each traffic signal 10 are working components 20 of the traffic signal, as in the prior art and thus which will not be described further here, and an impact sensor 22, such as an accelerometer although any suitable kind may be used. The working components 20 of the traffic signal 10 have an electrical feed 24 and the impact sensor 22 has an applied voltage via line 26. The impact sensor 22 is, in this case, a switch which is normally closed but which when triggered is open.

In the termination cabinet 14 are a monitoring unit 30 and a plurality of isolators 32, in this case four, one for each traffic signal 10. The applied voltage lines 26 to the impact sensors 22 of each traffic signal 10 are connected to the monitoring unit 30. The electrical feed 24 to the working components 20 of each traffic signal 10 are each connected to an isolator 32 which is controlled by the monitoring unit 30. Each isolator 32, typically an MCCB (multi-pole circuit breaker) although any other suitable type may be used, receives an electrical feed 34 from the control cabinet 16.

The monitoring unit 30 includes visual indicators (not shown) for the supply of power to each traffic signal 10 and for the activation of each impact sensor 22, although these could be omitted. Preferably the monitoring unit 30 also includes visual indicators for the status of other features of the traffic signals 10, such as to indicate failure of a bulb, or a software problem within the controls of the junction in the control cabinet 16. The monitoring unit 30 is also provided with additional contacts 36, 38 for integration into a telemetry system if provided, such that any failures noticed by the monitoring unit 30, or a complete power failure at the junction, can automatically be reported to a remote control room, but these can be omitted if not required.

The electrical isolation system operates as follows. When an impact sensor 22 is activated, the switch opens (effectively sending a signal) and the monitoring unit 30 identifies that it has gone open circuit. In response the monitoring unit 30 disconnects the voltage to the sensor 22 via electrical feed 26 and lights the respective visual indicator. In addition the monitoring unit 30 provides a constant latched output to the respective isolator 32 resulting in disconnection of the electrical supply to the working components 20 of the respective traffic signal 10 via the supply 24, and the relevant visual indicator is activated to show the disconnection. This disconnection occurs rapidly after activation of the impact sensor 22, (e.g. within 400 milliseconds) although any time period which meets the relevant regulations (if any) can of course be provided for.

The latched output to the respective isolator 32 prevents inappropriate re-energising of the supply to the working components 20 of the respective traffic signal 10. There is a reset switch (not shown) on the monitoring unit 30 for each feed to an impact sensor 22. However, even if the reset switch is activated the monitoring unit 30 maintains the latched output to the isolator 32 until it receives a further signal, in this case a return voltage via line 26, indicating that the sensor 22 has been reset or replaced. Receipt of such signal also switches off the visual indicators for activation of the sensor 22 and disconnection of the electrical feed 24.

Hence, when an impact is sensed the electrical supply to a traffic signal 10 is cut off quickly at a remote location and cannot be reconnected until such time as the impact sensor 22 has been reset or replaced. Thus, the electrical isolation system of the invention provides a significant improvement on safety when compared with the prior art.

Alternative forms of impact sensor, such as those which actively send a signal, may of course be used in place of the switch described above. In addition alternative forms of electrical isolator may be employed.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An electrical isolation system for street furniture having an electrical supply to working electrical components, the system including an impact sensor located in use within the street furniture and a monitoring unit and an electrical isolator located in use remote from the street furniture, wherein when the impact sensor is activated a signal is sent to the monitoring unit which sends a signal to the electrical isolator to disconnect the electrical supply to the working components of the street furniture.

2. An electrical isolation system according to claim 1 characterised in that when the electrical supply to the working components of the street furniture is disconnected the electrical supply to the impact sensor is also disconnected.

3. An electrical isolation system according to claim 1 characterised in that the monitoring unit includes a visual indicator of the status of the impact sensor.

4. An electrical isolation system according to claim 1 characterised in that the monitoring unit includes a visual indicator of the status of the electrical supply to the working components of the street furniture.

5. An electrical isolation system according to claim 1 characterised in that the monitoring unit includes a reset switch for the electrical supply to the impact sensor.

6. An electrical isolation system according to claim 1 characterised in that the monitoring unit maintains the signal to the isolator to disconnect the electrical supply to the working components of the street furniture until it receives a signal from the impact sensor to indicate that it has been replaced or reset.

7. An electrical isolation system according to claim 1 characterised in that the monitoring unit further includes connections for connection to a telemetry system such that activation of any impact sensor can be notified to a remote control room.

8. An electrical isolation system according to claim 1 characterised in that the monitoring unit further includes the ability to monitor other features of the street furniture for failure or errors.

9. An electrical isolation system according to claim 1 characterised in that the impact sensor is an accelerometer.

10. An electrical isolation system according to claim 1 characterised in that the electrical isolator is a multi-pole circuit breaker.

11. A method of providing electrical isolation in street furniture having an electrical supply to working electrical components, in the event that the street furniture is damaged, the method including the steps of:

a) sensing an impact suffered by the street furniture;

b) sending a signal to indicate that an impact has occurred to a monitoring unit at a location remote from the street furniture;

c) the monitoring unit acting to disconnect the electrical supply to the street furniture at the location remote from the street furniture.

12. A method according to claim 11 characterised in that it further includes the step of the monitoring unit acting to disconnect the electrical supply to the impact sensor when the impact occurs.

13. A method according to claim 11 characterised in that it further includes the step of activating a visual indicator on the monitoring unit to indicate the status of the impact sensor.

14. A method according to claim 11 characterised in that it further includes the step of activating a reset switch on the monitoring unit to restore the electrical supply to the impact sensor once the impact sensor has been reset or replaced.

15. A method according to claim 11 characterised in that the monitoring unit continues to act to disconnect the electrical supply to the street furniture until such time as a signal is received from the impact sensor to indicate that it has been reset or replaced.

16. Street Furniture having an electrical supply to working electrical components and including an electrical isolation system according to claim 1.

17. Street Furniture having an electrical supply to working electrical components and including an electrical isolation system which operates in accordance with the method of claim 1.

* * * * *